United States Patent
Corghi

(10) Patent No.: US 10,132,720 B2
(45) Date of Patent: Nov. 20, 2018

(54) WHEEL SERVICE MACHINE AND METHOD FOR LOCKING A WHEEL TO A WHEEL-HOLDER UNIT

(71) Applicant: CORGHI S.p.A., Correggio (Reggio Emilia) (IT)

(72) Inventor: Giulio Corghi, Correggio (IT)

(73) Assignee: NEXION S.P.A., Correggio (RE) (IT)

( * ) Notice: Subject to any disclaimer, the term of this patent is extended or adjusted under 35 U.S.C. 154(b) by 317 days.

(21) Appl. No.: 15/053,424

(22) Filed: Feb. 25, 2016

(65) Prior Publication Data
US 2016/0266010 A1    Sep. 15, 2016

(30) Foreign Application Priority Data
Mar. 12, 2015    (IT) .................................. BO15A0122

(51) Int. Cl.
*B60C 25/00*    (2006.01)
*G01M 17/013*    (2006.01)
(Continued)

(52) U.S. Cl.
CPC ....... *G01M 17/013* (2013.01); *B60C 25/0536* (2013.01); *B60C 25/0542* (2013.01);
(Continued)

(58) Field of Classification Search
CPC . G01M 17/013; G01M 1/045; B60C 25/0545; B60C 25/0536; B60C 25/0548; B60C 25/0542
See application file for complete search history.

(56) References Cited

U.S. PATENT DOCUMENTS

| | | | |
|---|---|---|---|
| 4,768,909 A | | 9/1988 | Warkotsch |
| 6,131,455 A | * | 10/2000 | Matsumoto ........... G01M 1/045 73/146 |

(Continued)

FOREIGN PATENT DOCUMENTS

| | | |
|---|---|---|
| EP | 2 218 591 | 8/2010 |
| EP | 2 218 591 B1 | 7/2011 |
| EP | 2 639 078 | 9/2013 |

OTHER PUBLICATIONS

Search report for corresponding Italian application No. B020150122 dated Nov. 16, 2015.

*Primary Examiner* — Richard Chang
(74) *Attorney, Agent, or Firm* — Wegman, Hessler & Vanderburg

(57) ABSTRACT

Described is a wheel service machine (1) comprising: a shaft (3) rotating about a relative longitudinal axis (A), and a contact element (4), connected to the shaft (3) for rotating integrally with it and designed to make contact with the rim (2a) supported by the shaft (3); a locking device (5), which can be removably coupled to the shaft (3) and designed to slide relative to the shaft (3) along the longitudinal axis (A) and lock the rim (2a) interposed between the contact element (4) and the locking device (5); a fastening element (6) movably connected to the shaft (3) for moving parallel to the longitudinal axis (A) and designed for coupling with the locking device (5), for pulling it in movement; actuator (7) positioned on the machine and connected to the fastening element (6), wherein the locking device (5) comprises an emitter (8) designed for generating a wireless control signal, received by a wireless signal receiver (9) connected to the actuator (7), activates them for moving the locking device (5).

20 Claims, 9 Drawing Sheets

(51) Int. Cl.
*B60C 25/05* (2006.01)
*G01M 1/04* (2006.01)

(52) U.S. Cl.
CPC ...... *B60C 25/0545* (2013.01); *B60C 25/0548* (2013.01); *G01M 1/045* (2013.01)

(56) References Cited

U.S. PATENT DOCUMENTS

| | | | | |
|---|---|---|---|---|
| 6,240,995 B1 * | 6/2001 | Corghi | ................ | B60C 25/138 157/1.22 |
| 6,481,281 B1 * | 11/2002 | Gerdes | ................ | G01M 1/045 279/131 |
| 6,516,855 B2 * | 2/2003 | Corghi | ............... | B60C 25/0545 157/1.1 |
| 6,527,032 B2 * | 3/2003 | Corghi | ............... | B60C 25/0545 157/1.24 |
| 6,684,517 B2 * | 2/2004 | Corghi | ................ | G01M 1/045 33/203.12 |
| 6,763,715 B2 * | 7/2004 | Corghi | ................ | G01M 1/045 73/487 |
| 7,784,519 B2 * | 8/2010 | Sotgiu | .................. | B60C 25/138 157/1.17 |
| 7,987,889 B1 * | 8/2011 | Story | ................ | B60C 25/0545 157/14 |
| 8,171,790 B2 * | 5/2012 | Sotgiu | .................. | G01M 1/045 73/460 |
| 8,453,702 B2 * | 6/2013 | Corghi | ............... | B60C 25/0545 157/1.17 |
| 8,544,520 B2 * | 10/2013 | Sotgiu | ............... | B60C 25/0542 157/1.17 |
| 8,770,254 B1 * | 7/2014 | Hanneken | ............ | B60C 25/138 157/1.17 |
| 8,899,296 B2 * | 12/2014 | Sotgiu | ................... | B60C 25/01 157/1.17 |
| 9,038,692 B2 * | 5/2015 | Sotgiu | .................... | B60C 25/00 157/20 |
| 9,132,706 B2 * | 9/2015 | Bonacini | ............ | B60C 25/0542 |
| 9,199,519 B2 * | 12/2015 | Bonacini | ............ | B60C 25/0545 |
| 9,200,976 B2 * | 12/2015 | Ye | ........................ | G01M 1/045 |
| 9,267,860 B2 * | 2/2016 | Kanei | ...................... | G01M 1/06 |
| 9,322,734 B2 * | 4/2016 | Tachibana | ............. | B60C 19/00 |
| 9,417,157 B2 * | 8/2016 | Buzzi | .................... | G01M 1/045 |
| 9,834,046 B2 * | 12/2017 | Nicolini | ............... | B60C 25/056 |

* cited by examiner

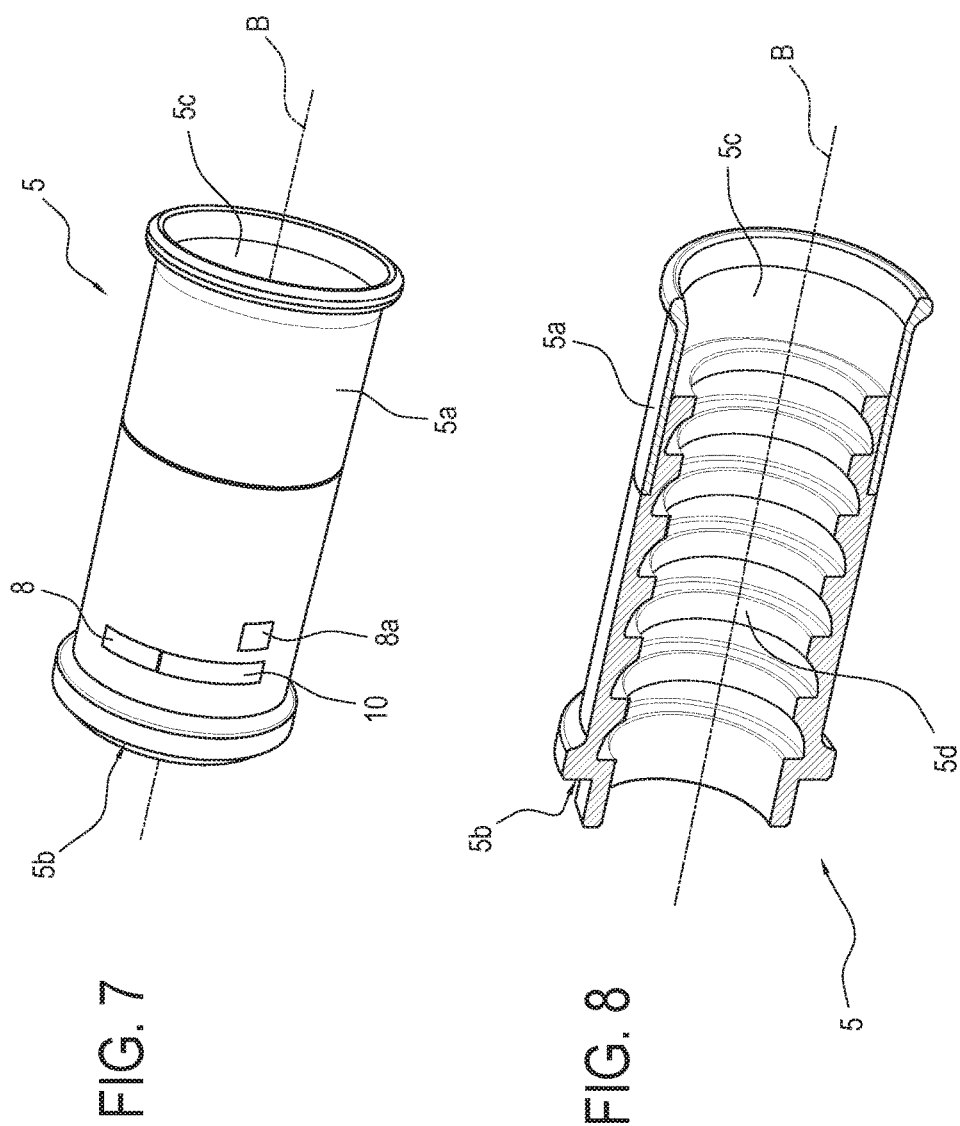

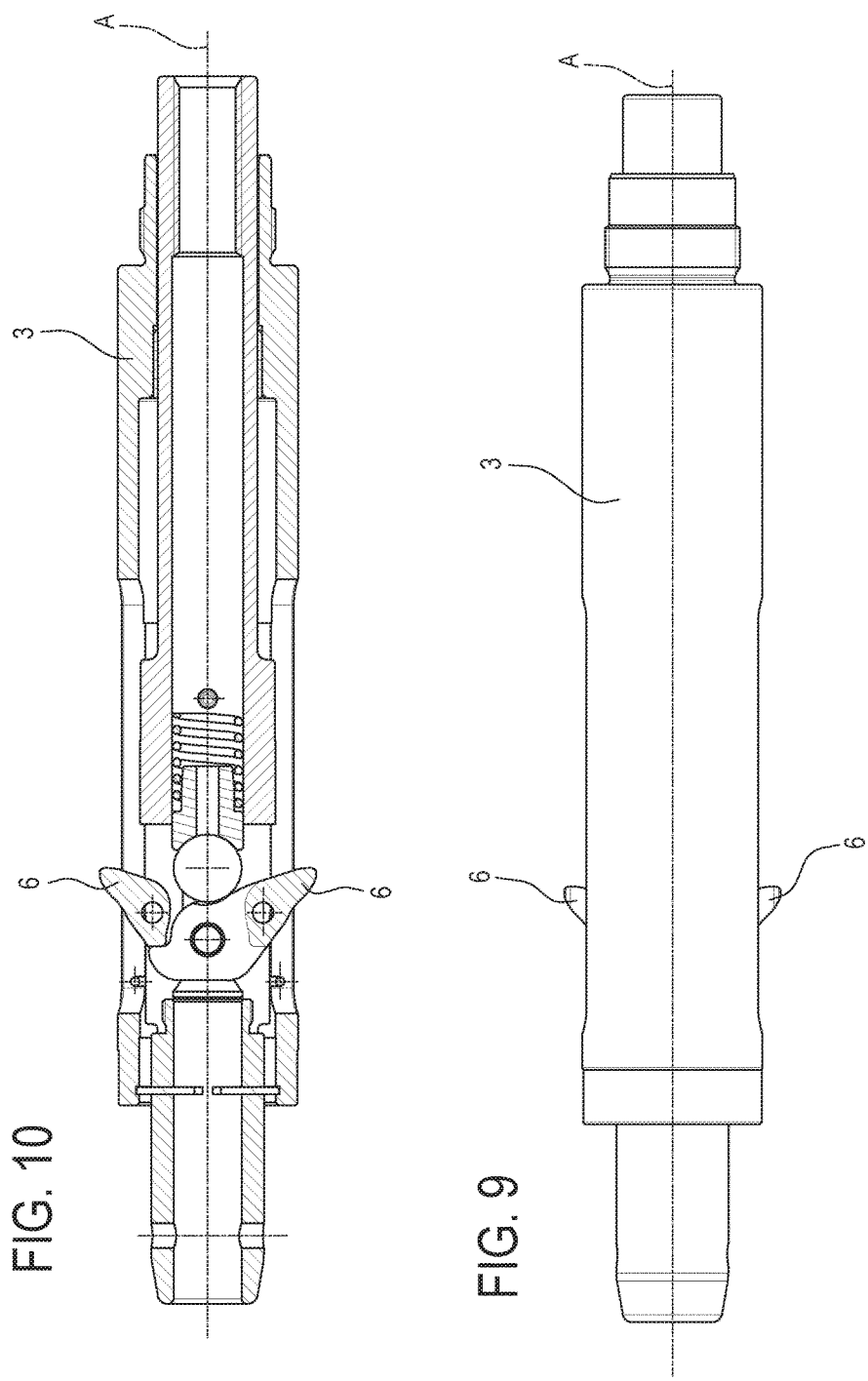

WHEEL SERVICE MACHINE AND METHOD FOR LOCKING A WHEEL TO A WHEEL-HOLDER UNIT

BACKGROUND OF THE INVENTION

This invention relates to a wheel service machine and a method for locking a wheel to a wheel-holder unit. This invention also provides a device for locking the wheel to a wheel-holder unit.

The invention applies to the field of equipment for tyre repair specialists and in particular to that of the wheel service machines. It should be noted that the term wheel (for vehicle) means the coupling between a tyre and a corresponding rim (that is, the overall tyre/rim).

Amongst the prior art wheel service machines there are two main types:
  balancing machines, designed to measure the static and/or dynamic unbalancing of a wheel;
  machines for fitting and removing a tyre on/from a corresponding rim (also known in the prior art as a "tyre changer machine").

The prior art wheel service machines usually comprise a wheel-holder unit having a supporting shaft, designed for rotating a wheel (or a rim) about a main axis of rotation, and a locking device, designed for fixing the wheel (or the rim) to the supporting shaft for rotating together with it, avoiding relative movements between wheel and wheel-holder unit which might cause malfunctions of the wheel service machine and/or damage to the wheel.

Wheel service machines are known in the prior art comprising a manual locking device, such as, for example, shown in patent document U.S. Pat. No. 4,768,909, which illustrates a locking device for a balancing machine. The locking device comprises a pair of threaded elements, movable radially towards (or away from) a supporting shaft, which is also threaded, for coupling with (or uncoupling from) it. When the threaded elements are not coupled to the supporting shaft, the locking device is free to slide along the supporting shaft. When the threaded elements are coupled the supporting shaft, the locking device is movable by roto-translation along the supporting shaft, to move into contact with a portion of the wheel (or the rim) and lock the position against a contact element (for example, a centring cone or a supporting flange).

These manual locking devices have considerable drawbacks. A first drawback is linked to the time necessary for the locking. A further drawback is linked to the forces which a user must apply to activate the device. Lastly, these manual devices suffer from a safety problem, since the resistance of the system is linked to the force with which the locking element is clamped.

In order to deal with these drawbacks, wheel service machines are known in the prior art comprising a motor-driven locking device, typically activated by an actuator. By way of example, the patent document EP2218591B1, in the name of the same Applicant, illustrates a locking device (for a tyre changer machine) comprising an actuator. The actuator is designed to move the locking device along a supporting shaft and bringing it into contact with a wheel (or a rim) for fixing it to a supporting flange preventing the relative rotation.

These locking devices have some drawbacks. A first drawback is linked to the increase in weight of the locking device, which limits the ease of transport and use. A further drawback is linked to the reliability of these devices, which are normally powered by a battery, which may run flat or become faulty. These devices are also unsuitable for use on balancing machines because they are per se significantly unbalanced.

There are also prior art wheel service machines wherein an actuator positioned on the machine is designed to move the locking device. Typically, the actuator is powered through the electricity network. The supporting shaft has a plurality of fastening elements, movable in a longitudinal direction defined by the supporting shaft and designed for coupling with a locking element and moving it between an active position, wherein it is in contact with a wheel (or with a rim) for fixing it to a supporting flange and a configuration of non-interference with the wheel (or with the rim). Typically, the actuator which moves the fastening elements is actuated by a control pedal located at the side of the machine. Typically, to lock the wheel to the supporting shaft of a balancing machine it is necessary keep the wheel raised, positioning with a hand the locking element and simultaneously pressing the control pedal. This solution is obviously inconvenient. The view of the pedal, both in tyre changer machines and in balancing machines, may be obstructed by the presence of the wheel; the user is thus required to operate in conditions of poor visibility, and the locking operation may be particularly difficult if working with heavy and/or large wheels. This drawback is particularly serious if the wheel service machine is a balancing machine with a horizontal axis (that is, a balancing machine wherein the supporting shaft is oriented perpendicularly to the weight force).

SUMMARY OF THE INVENTION

The aim of this invention is to provide a wheel service machine and a method for locking a wheel to a wheel-holder unit which overcome the above-mentioned drawbacks of the prior art.

More specifically, the aim of this invention is to provide a wheel service machine and a method for locking a wheel to a wheel-holder unit which are particularly quick and easy to use for the tyre service specialist.

A further aim of this invention is to provide a wheel service machine and a method for locking a wheel to a wheel-holder unit which is particularly simple and reliable.

A further aim of this invention is to provide a device for locking a wheel on a rotary shaft of a wheel service machine. These aims are fully achieved by the machine, by the locking device and method according to the invention, as characterised in the appended claims.

More specifically, the wheel service machine according to the invention is designed to perform operations on a wheel having a rim and a tyre. It should be noted that the machine is also designed to perform operations on only the rim.

The machine comprises a shaft rotating about a relative longitudinal axis, designed to rotatably support the wheel.

The machine comprises a contact element, connected to the shaft for rotating integrally with it. The contact element is designed to make contact with the rim supported by the shaft; the contact element constitutes a stop, that is, end-of-stroke element, relative to a movement of the rim along the shaft, after the rim has been coupled to the shaft in such a way that a free end of the shaft enters into a central hole of the rim.

The machine comprises a locking device, which can be removably coupled to the shaft and designed to slide relative to the shaft, along the longitudinal axis, between an active position and a position of non-interference with the rim. In the active position, close to the contact element, the locking device fixes the rim, interposed between the contact element and the locking device, to the shaft. In the position of non-interference with the rim, the locking device is moved away from the contact element.

The contact element is, for example, a plate integral with the shaft (for defining, for example, a rotary supporting plate).

In another example, the machine comprises a centring cone, designed to operating in conjunction with the contact element.

Preferably, the centring cone is removably coupled to the shaft of the wheel service machine. The centring cone comprises a central hole designed to be passed through by the shaft of the wheel service machine.

The machine comprises a fastening element movably connected to the shaft to move parallel to the longitudinal axis. The fastening element is designed for coupling with the locking device, for moving it between an active position, close to the contact element, for locking the rim interposed between the contact element and the locking device it, and a position away from the contact element, of non-interference with the rim. The machine comprises an actuator (later in the text, this feature, "actuator", is also referred to as "actuator means", meaning any type of actuator) positioned on the machine and connected to the fastening element for moving it along the shaft, parallel to the axis.

According to the invention, the locking device comprises an emitter designed for generating a wireless control signal; the machine comprises a wireless signal receiver, connected to the actuator and designed to actuate it in response to the control signal.

Preferably, the locking device comprises a surface which can be gripped by a user and an actuator element connected to the emitter for controlling the generation of the wireless control signal. The actuator element is designed to be actuated by hand by the user gripping the locking device.

It should be noted that this solution increases the speed of locking and allows the user to actuate the actuator without using a pedal, as shown the prior art.

Preferably, the locking device comprises a power supply unit designed for electrically powering the transmitter.

Preferably, the locking device comprises a protective element movable between an activated configuration, wherein it prevents an interaction of the user with the actuator element, and a deactivated configuration, wherein an interaction of the user with the manual actuator element is allowed.

It should be noted that this solution allows the reliability of the machine to be increased, reducing the probability of accidental actuation of the actuator (means).

According to an embodiment, the wireless control signal is a mechanical wave. Preferably, the mechanical wave is a pressure wave. Even more preferably, the mechanical wave is a sound wave.

According to a further embodiment, the wireless control signal is an electromagnetic wave.

According to an embodiment, the wireless control signal is a sound wave having a frequency of between 20 kHz and 2 MHz. According to a particular embodiment, the emitter is a loudspeaker or a "whistle" designed for emitting sound waves having a frequency in the ultrasound range. Preferably, the wireless signal receiver is a microphone.

According to another embodiment, the wireless control signal is an electromagnetic wave having a frequency of between 1 kHz and 400 MHz. Preferably, the wireless control signal is of the modulated type.

According to an embodiment, the machine has the longitudinal axis directed horizontally, and the locking device is tubular, to define a through hole which allows the shaft to pass through.

According to an embodiment, the wheel service machine is a balancing machine, designed for assessing the static and dynamic imbalances of a wheel or of a single rim.

According to another embodiment, the rotary shaft is hollow, and has the longitudinal axis directed vertically. The locking element is preferably a clamping rod having a first end and a second end; the first end is designed to be inserted in the hollow shaft and connect to the actuator (means), and the second end can be gripped by a user.

Preferably, the emitter is an optical emitter designed for emitting an optical signal, directed along the longitudinal axis, in an empty passage defined inside the shaft. According to an embodiment, the wheel service machine is a tyre changer machine, designed to perform the removal and fitting of a tyre from and on a corresponding rim.

This invention also defines a locking device for locking a wheel, equipped with a rim and a tyre, on a rotary shaft of a wheel service machine. The machine comprises a contact element, which is integral with the shaft to make contact with the rim and a fastening element, movably connected to the shaft for coupling with the locking device and moving it between an active position, close to the contact element, for locking the rim interposed between the contact element and the locking device it, and a position away from the contact element, of non-interference with the rim. The machine also comprises actuator (means) positioned on the machine and connected to the fastening element; a wireless signal receiver, connected to the actuator (means), is designed to activate the actuator (means) in response to a wireless control signal. According to the invention, the locking device is without an actuator, is elongate in a longitudinal direction and comprises a contact surface, positioned transversely to the longitudinal direction, and designed to make contact with the rim interposed between the contact element and the device for locking and fixing the rim the shaft. The locking device also comprises a coupling and guide surface, cylindrical in shape, designed for coupling to the shaft, and comprises a fastening structure, designed for coupling with the fastening element and allowing a pulling of the locking device along the shaft. According to the invention, the locking device also comprises an emitter, designed to generate the control signal. Preferably, the control signal is a wireless control signal. Preferably, the locking device comprises a surface which can be gripped by a user and an actuator element connected to the emitter for controlling the generation of the control signal. The actuator element is designed to be actuated by hand by the user gripping the device.

This invention also relates to a method for locking a wheel, having a rim and a tyre, on a shaft of a wheel service machine, wherein the shaft rotates about a relative longitudinal axis, comprising the following steps:
  coupling the rim to the shaft;
  coupling to the shaft a locking device, in such a way that the rim is interposed between the locking device and a contact element which is integral with the shaft and designed to make contact with the rim;
  activating the actuator mans positioned on the machine and connected to a fastening element connected to the shaft, for moving the fastening element longitudinally along the shaft and intercepting the locking device for locking the rim against the contact element.

According to the invention, the step of activating of the actuator (means) comprises the steps of:

generating a wireless control signal using an emitter, connected to the locking device;

receiving the wireless control signal using a wireless signal receiver designed to activate the actuator (means) in response to the wireless control signal.

If the locking device comprises a surface which can be gripped by a user and an actuator element connected to the emitter for controlling the generation of the wireless control signal, the step of generating a wireless control signal comprises a step of:

actuating the emitter using the actuator element, activated by hand by the user gripping the locking device.

If the locking device comprises a protective element, movable between an activated configuration, wherein it prevents a user from interacting with the actuator element, and a deactivated configuration, wherein it allows a user to interact with the manual actuator element, the method for locking the wheel comprising a further step of:

moving the protective element from the activated configuration to the deactivated configuration.

If the locking device is tubular, the step of coupling the locking device to the shaft comprises a step of:

inserting the shaft in the locking device.

If the machine has the hollow shaft, the locking device is of a clamping rod having a first end, which can be coupled to the actuator (means), and a second end, which can be gripped by a user, the step of coupling the locking device to the fastening element comprising a step of:

inserting the locking device in an empty passage defined inside the shaft.

According to another aspect, this invention also provides a locking device for locking the wheel on the rotary shaft of a wheel service machine.

The locking device is without an actuator; in effect, the actuator (means) positioned on the machine are designed for moving a fastening element movably connected to the rotary shaft to move longitudinally along the shaft.

Preferably, the locking device is elongate in a longitudinal direction.

The locking device comprises a contact surface, to come into contact with the rim (when the rim is coupled to the rotary shaft and is interposed between the contact element and the locking device). The contact surface is preferably positioned transversely to the longitudinal direction.

The locking device comprises a coupling and guide surface for coupling with the shaft. The coupling and guide surface is preferably cylindrical in shape.

The locking device comprises a fastening structure, designed for coupling with the fastening element and allowing a pulling of the locking device along the shaft.

Moreover, the locking device comprises an emitter designed for generating a wireless control signal, which can be received by the wireless signal receiver positioned on the machine, to actuate the actuator (means).

Preferably, the device can be gripped with one (single) hand and the wireless signal emitter on the device can be activated by the same hand which grips the device.

In an embodiment, the actuator element controls both the locking and the releasing of the wheel interposed between the contact element and the locking device. The emitter, activated by the actuator element, is designed for emitting a wireless control signal to actuate the actuating (means) and move the locking device both from the active position to the non-interference position and, vice versa, from the non-interference position to the active position.

According to a possible embodiment, the locking device comprises a first and a second actuator element. Preferably, the first actuator element activates the emitter for emitting a wireless signal control which activates the actuator (means) for locking the wheel, the second actuator element activates the emitter for emitting a wireless control signal which activates the actuator (means) to release the wheel interposed between the contact element and the locking device.

According to a further embodiment, the locking device comprises a plurality of auxiliary controls (or control elements, or means; for example, auxiliary pushbuttons) designed for activating the emitter (or a plurality of corresponding emitters). Preferably, each auxiliary pushbutton is connected to the (respective) emitter for controlling the emission of a particular wireless control signal.

In an example embodiment, a (first) auxiliary pushbutton activates the emitter for emitting a first wireless control signal which, received by a second wireless signal receiver connected to a solenoid valve connected to a compressed air circuit, controls the activation to allow an inflation of the tyre.

In an example embodiment, a (second) auxiliary pushbutton activates the emitter for emitting a wireless control signal which, received by a third wireless signal receiver connected to a lifting apparatus, controls a lifting actuator for moving a lifting apparatus (that is, a lifting device with which the tyre changer machine is equipped, for helping the tyre service specialist to raise the wheel above the ground).

According to an embodiment, the locking device comprises a plurality of emitters. Preferably, each auxiliary pushbutton is connected to an emitter for controlling the emission of a particular wireless control signal.

Preferably, the wireless signal emitters and receivers are designed for short distance communication, in such a way as not to interfere with other emitters and/or receivers present in other wheel service machines.

In a further embodiment, the communication signals between the wireless emitters and receivers are coded, in such a way as not to interfere with other emitters and/or receivers present in other wheel service machines.

BRIEF DESCRIPTION OF THE DRAWINGS

This and other features of the invention will become more apparent from the following detailed description of a preferred, non-limiting example embodiment of it, with reference to the accompanying drawings, in which:

FIG. 7 illustrates a perspective view of a locking device, according to this description;

FIG. 8 illustrates a cross section of the locking device of FIG. 7;

FIGS. 9, 10 and 11 illustrate a particular embodiment of the shaft of the machine according to this invention.

DESCRIPTION OF THE PREFERRED EMBODIMENTS

Figure 1:
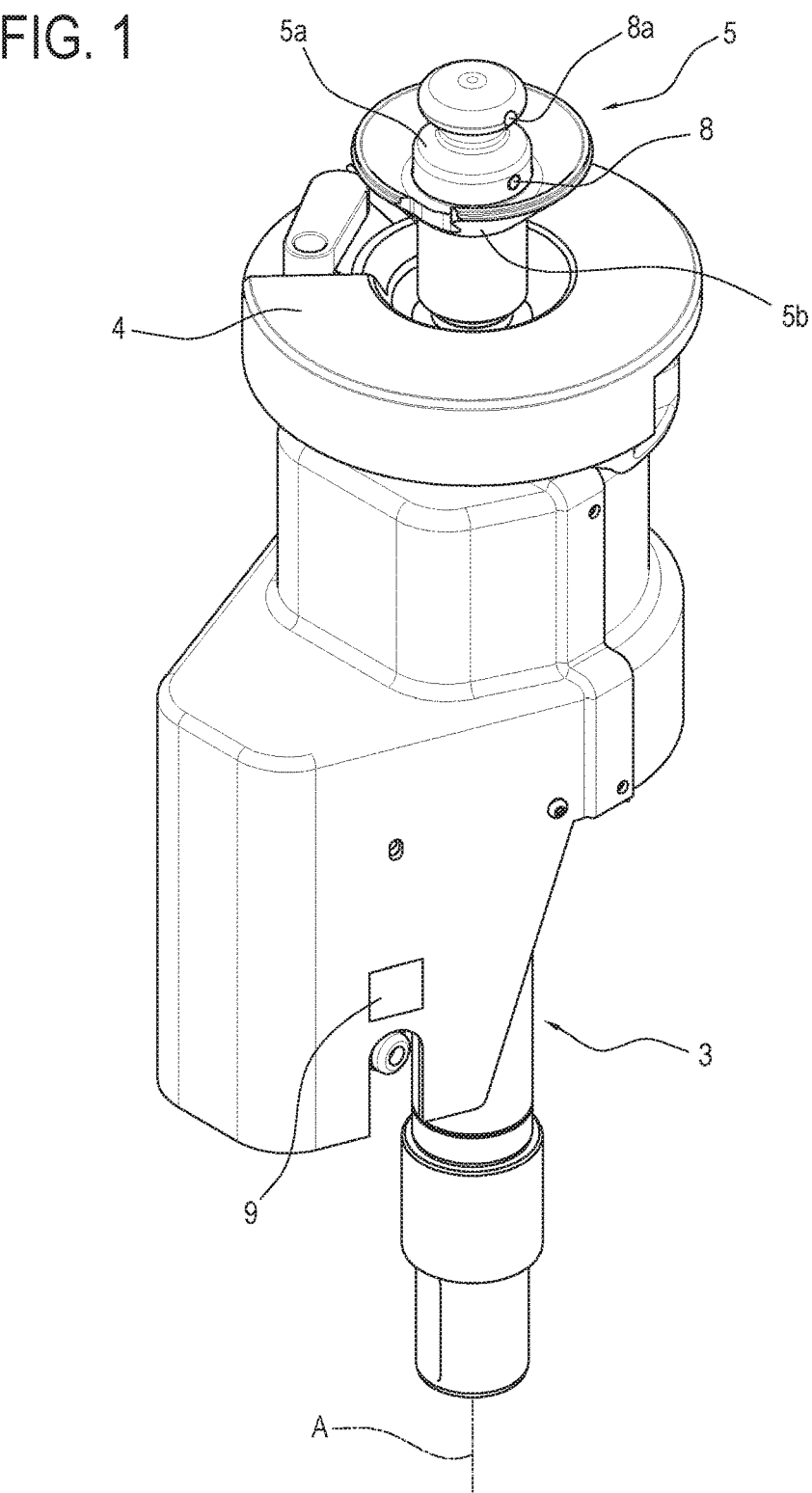
FIGS. 1 to 3 illustrate a perspective view of a detail of the machine according to this description.
Figure 2:
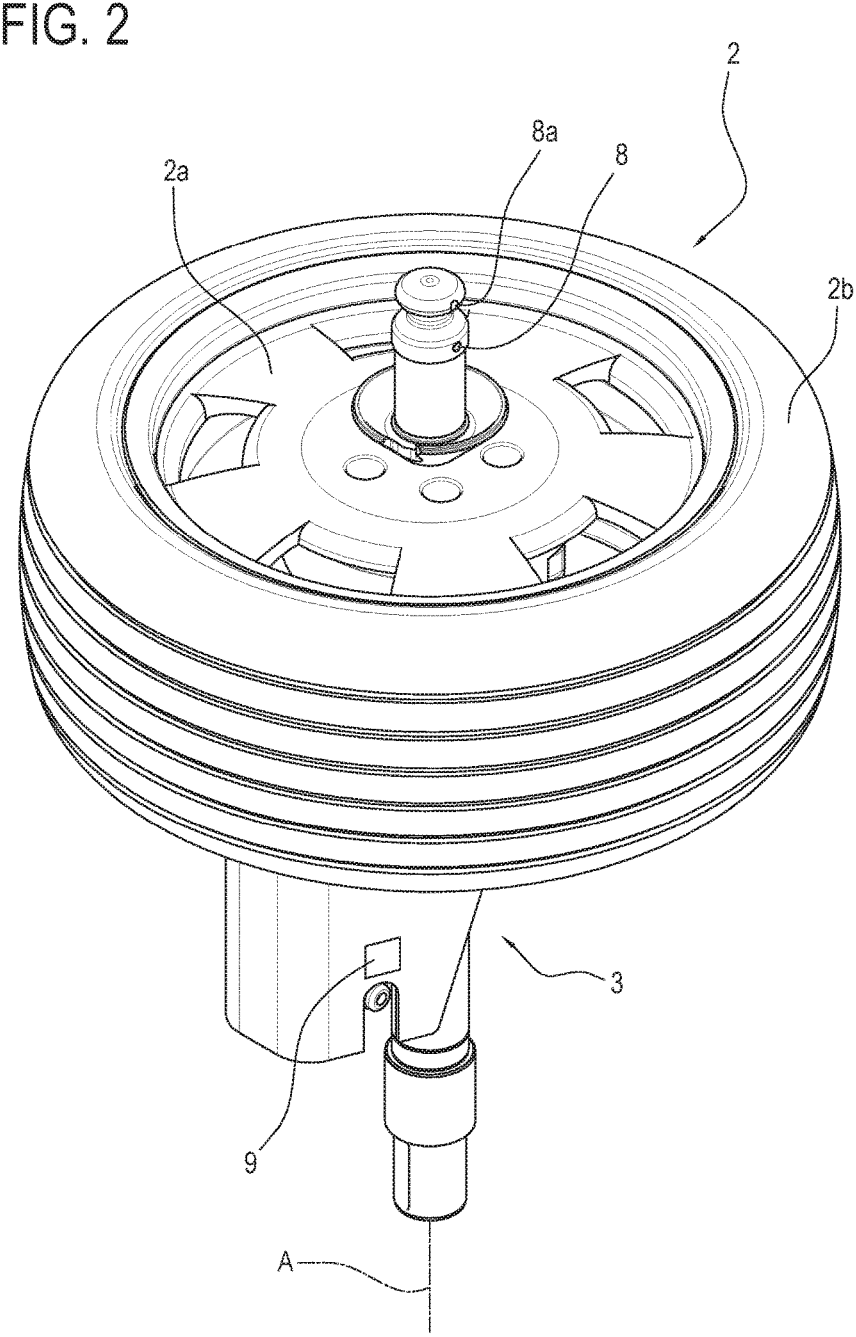
Figure 3:
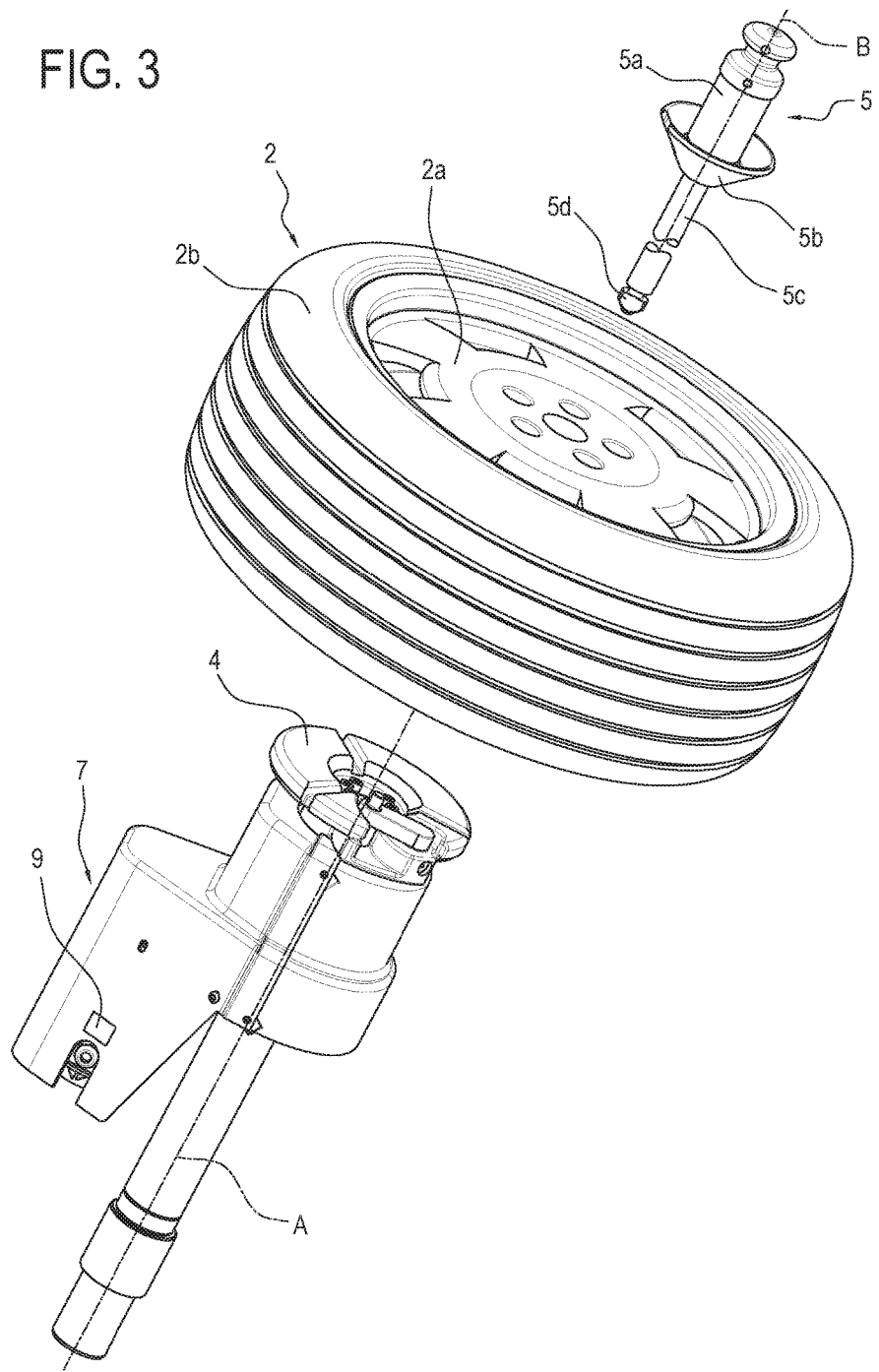
Figure 4:
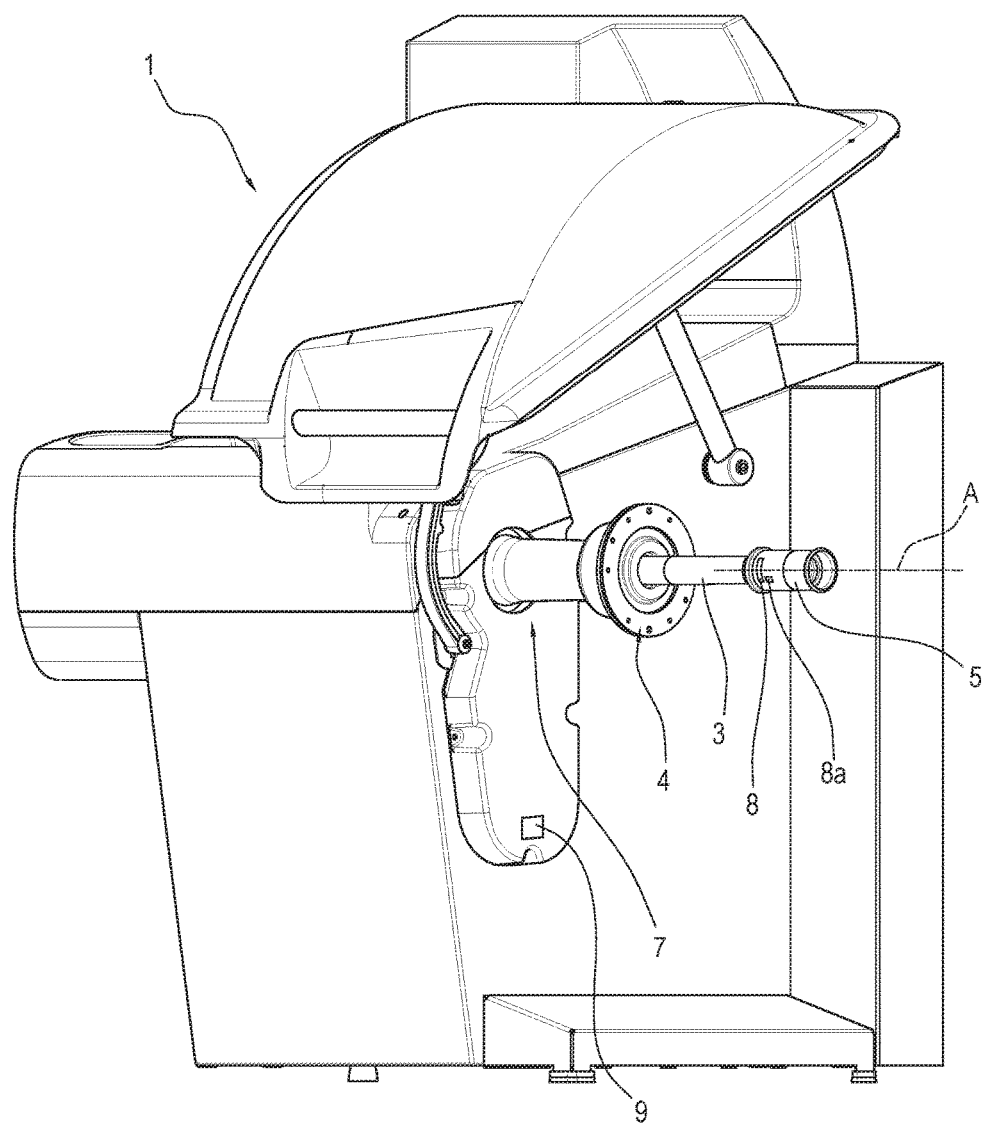
FIG. 4 illustrates a perspective view of a wheel service machine, according to this description, according to a variant embodiment.
Figure 5:
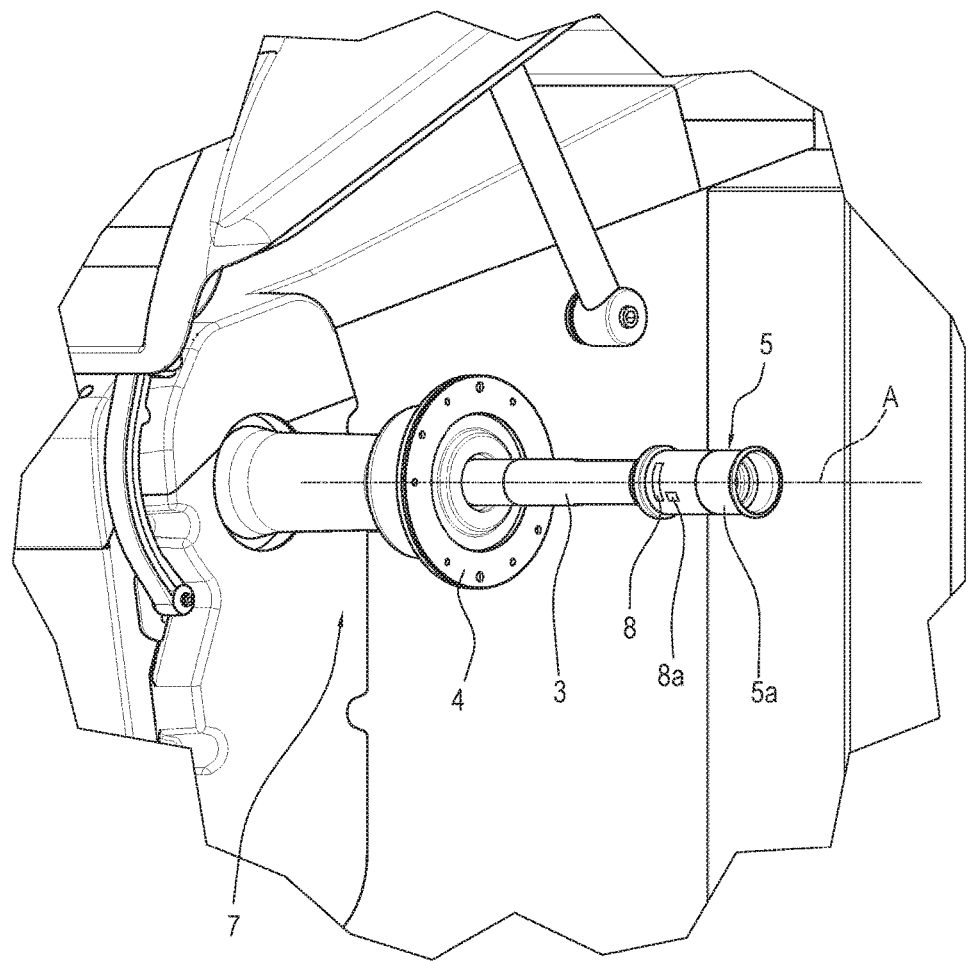
FIG. 5 illustrates a detail of the machine of FIG. 4.
Figure 6:
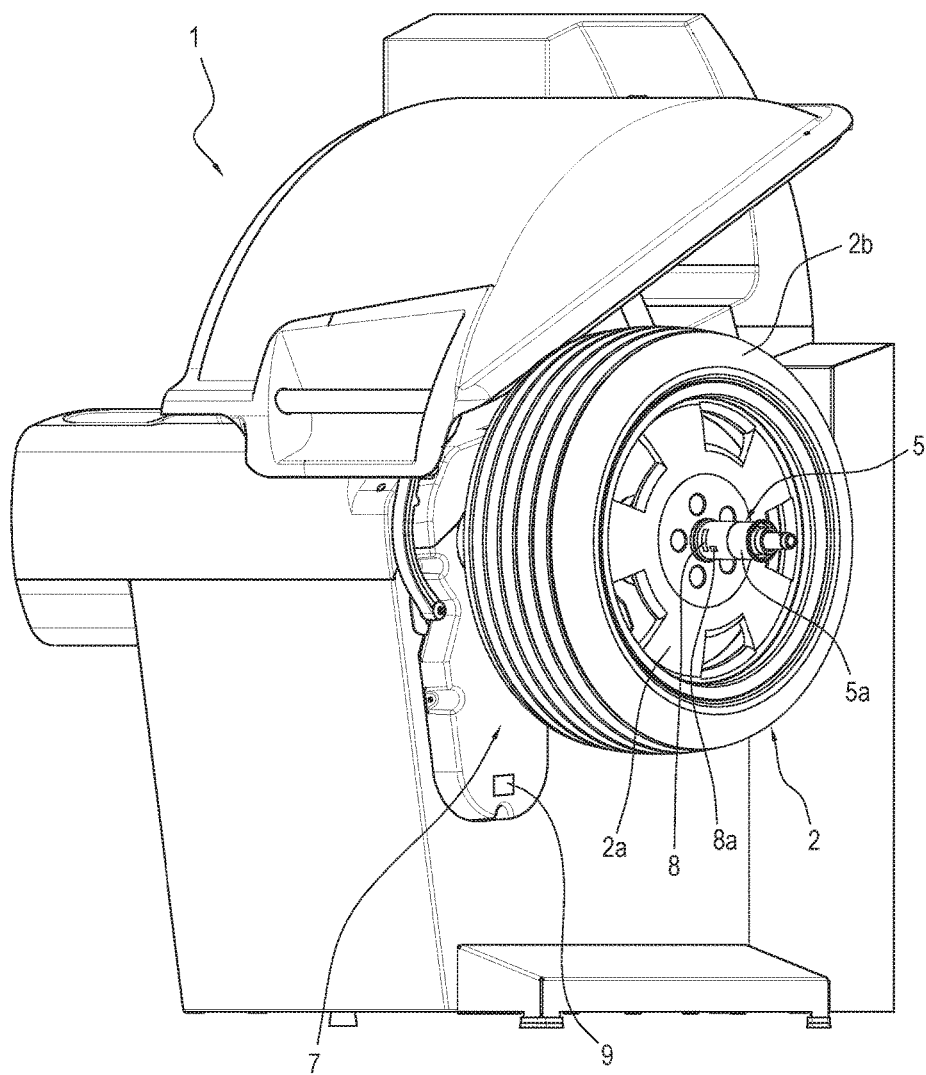
FIG. 6 illustrates the machine of FIG. 4 with a wheel coupled to the shaft.
Figure 11:
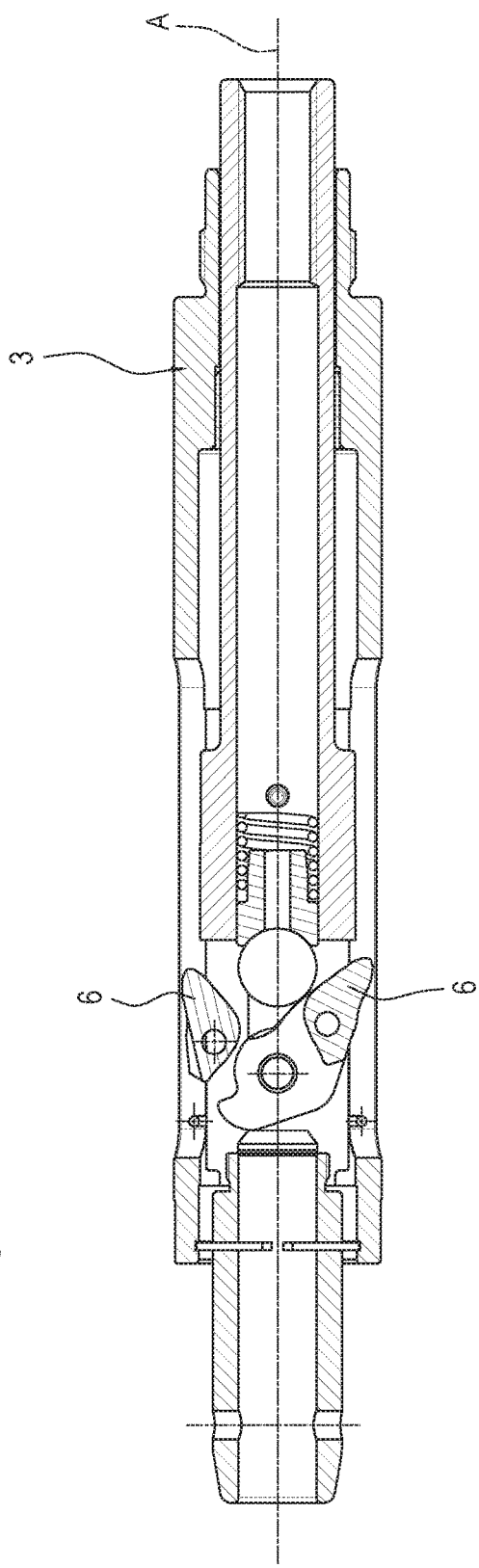

With reference to the accompanying drawings, the numeral 1 denotes a wheel service machine, that is to say, a machine 1 designed to perform operations on a wheel 2 having a rim 2a and a tyre 2b.

The machine 1 comprises a shaft 3 rotating about a relative longitudinal axis A, designed to rotatably support the wheel 2. More specifically, the machine 1 comprises a contact element 4, connected to the shaft 3 for rotating integrally with it. The contact element 4 is designed to make contact with the rim 2a supported by the shaft 3 and defines a supporting surface for the rim 2a. The supporting surface is substantially perpendicular to the longitudinal axis A. According to one embodiment, the contact element 4 is a rotary supporting plate.

According one embodiment, a centring cone is coupled to the shaft 3 of the wheel service machine 1. The centring cone comprises an axial hole designed to be passed through by the shaft 3 of the wheel service machine 1.

The machine 1 comprises a locking device 5. The locking device can be removably coupled to the shaft 3, and is designed to slide relative to the shaft 3 along the longitudinal axis A. More specifically, the locking device 5 is movable along the shaft 3 between an active position, close to the contact element 4, wherein it locks the rim 2a interposed between the contact element 4 and the locking device 5, and a position of non-interference with the rim 2a, away from the contact element 4.

The machine 1 comprises a fastening element 6, movably connected to the shaft 3 to move parallel to the longitudinal axis A. The fastening element 6 is designed for coupling with the locking device 5 and moving it between an active position, close to the contact element, for locking the rim interposed between the contact element and the locking device it, and a position away from the contact element, of non-interference with the rim. More specifically, the fastening element 6 is connected to the actuator (means) 7 positioned on the machine, for being moved along the shaft 3.

In one embodiment, the fastening element 6 is designed to pass from a deactivated configuration, wherein it does not interfere with the locking device 5, to an activated configuration wherein it projects from the shaft 3 for coupling with the locking device 5. Preferably, the actuator (means) 7 are connected to the fastening element 6 to allow a passage from the activated configuration to the deactivated configuration. Even more preferably, the actuator (means) 7 are connected to a kinematic mechanism which allows both the movement of the fastening element 6 from the activated configuration to the deactivated configuration (and vice versa) and the movement of the fastening element 6 along the shaft 3.

According to the invention, the machine 1 comprises a wireless signal receiver 9, connected to the actuator (means) 7, and designed to actuate the actuator (means) 7 in response to a wireless control signal.

The locking device 5 according to the invention comprises an emitter 8 designed for generating a wireless control signal which, captured by the receiver 9, controls the activation of the actuator (means) 7 for moving the fastening element 6 and the locking device 5 coupled to it. Preferably, the wireless control signal controls the activation of the actuator (means) 7 for moving the fastening element 6 and moving the locking device 5 between an active position, close to the contact element 4, wherein it locks the rim 2a interposed between the contact element 4 and the locking device 5, and a position away from the contact element 4, of non-interference with the rim 2a.

In one embodiment, the locking device 5 comprises a grip surface 5a which can be gripped by a user and an actuator triggering element 8a connected to the emitter 8 for controlling the generation of the wireless control signal. Preferably, the actuator triggering element 8a is designed to be actuated by hand by the user gripping the locking device 5. Preferably, the manual actuator element is a pushbutton positioned on the grip surface 5a which can be gripped.

In one embodiment the locking device 5 comprises a protective element 10 designed to avoid accidental actuation of the actuator (means) 7. More specifically, the protective element 10 is movable between an activated configuration, wherein it prevents the user from interacting with the actuator triggering element 8a, and a deactivated configuration, wherein it allows the user to interact with the actuator triggering element 8a.

In one embodiment, the wireless control signal is a pressure wave (that is, a sound wave). Preferably, the sound wave has a frequency of between 20 kHz and 2 MHz. In other words, the emitter 8 and the receiver 9 are, respectively, an ultrasound emitter and receiver.

In another embodiment the wireless control signal is an electromagnetic wave. According to one aspect of this description, the electromagnetic wave has a frequency of between 1 kHz and 300 GHz. In other words, the emitter 8 and the receiver 9 are, respectively, a radio frequency emitter and receiver. According to a further aspect of this description, the electromagnetic wave has a frequency of between 300 GHz and 400 THz. In other words, the emitter 8 and the receiver 9 are, respectively, an infrared emitter and receiver.

According to a further aspect of this description, the emitter 8 and the receiver 9 are, respectively, a visible light emitter and receiver. In other words, the wireless control signal is an electromagnetic wave with a frequency of between 400 and 790 THz.

Preferably, the electromagnetic wireless control signal is of the modulated type. Even more preferably, a modulating signal of the wireless control signal is of the coded type and the receiver is able to demodulate and decode the information contained in the wireless control signal. This solution allows the emitter 8 and the receiver 9 to communicate without interfering with other signal emitting or receiving devices positioned close by.

In one particular embodiment, the shaft 3 has the longitudinal axis A directed horizontally (that is, directed perpendicularly to the weight force). Preferably, the locking device 5 is tubular and defines a through hole, to allow the shaft 3 to pass through. In other words, the locking device 5 comprises a hollow cylindrical body, having an outer lateral surface defining the grip surface 5a which can be gripped by a user. The hole of the tubular body (of the locking device 5) has a relative axis B, which operatively is coincident with the longitudinal axis A of the rotary shaft 3.

In another embodiment, the shaft 3 has the longitudinal axis A directed vertically (that is, directed parallel to the weight force). Preferably, the shaft 3 is hollow to allow the locking device 5 to pass through. More specifically, the locking device 5 is a clamping rod having a first end, designed to be inserted in the hollow shaft 3 and connect to the actuator (means) 7, and a second end which can be gripped by a user. Preferably, the clamping rod comprises a conical portion designed to come into contact with the rim 2a when the locking device 5 is in the active position. More specifically, the conical portion comes into contact with a first surface of the rim, located opposite the rim 2a relative to a surface of contact between the rim 2a and contact element 4. In one particular embodiment, the emitter 8 is an optical emitter designed for emitting an optical control signal, directed along the longitudinal axis A. In other words, the optical control signal generated by the emitter 8 propagates in an empty passage defined inside the shaft 3.

This invention also defines a locking device 5 for locking a wheel 2, equipped with a rim 2a and a tyre 2b, on a rotary shaft 3 of a wheel service machine 1. The machine 1 comprises a contact element 4, which is integral with the shaft 3 to make contact with the rim 2a, and a fastening element 6 movably connected to the shaft 3 for coupling with the locking device 5 and pulling it in movement. The machine 1 also comprises actuator (means) 7 positioned on the machine and connected to the fastening element 6. The actuator (means) 7 are connected to a wireless signal receiver 9, designed for activating the actuator (means) 7 in response to a wireless control signal. The locking device 5 is without an actuator, and is preferably elongate in a longitudinal direction. The locking device 5 comprises a contact surface 5b, positioned transversally to the longitudinal direction and designed to make contact with the rim 2a interposed between the contact element 4 and the locking device 5. The locking device 5 also comprises a coupling and guide surface 5c, cylindrical in shape, designed for coupling to the shaft 3, and a fastening structure 5d, designed for coupling with the fastening element 6 and allowing a pulling of the locking device 5 along the shaft 3. According to the invention, the locking device 5 comprises an emitter, designed to generate the wireless control signal. Preferably, the locking device 5 comprises a grip surface 5a which can be gripped by a user and an actuator triggering element 8a connected to the emitter 8 for controlling the generation of the wireless control signal. Preferably, the actuator triggering element 8a is designed to be actuated by hand by the user gripping the locking device 5. Preferably, the actuator triggering element 8a controls both the locking and the releasing of the wheel 2 interposed between the contact element 4 and the locking device 5.

In one embodiment, the locking device 5 is equipped with two actuator elements 8a. Preferably, the first actuator triggering element 8a controls the locking and the second actuator triggering element 8a controls the releasing of the wheel 2 between the contact element 4 and the locking device 5.

It should be noted that this invention also relates to a method for locking a wheel 2, having a rim 2a and a tyre 2b, on a shaft 3 of a wheel service machine 1, wherein the shaft 3 rotates about a relative longitudinal axis A, comprising the following steps:
coupling the rim 2a to the shaft 3;
coupling to the shaft 3 a locking device 5, in such a way that the rim 2a is interposed between the locking device 5 and a contact element 4 which is integral with the shaft 3 and designed to make contact with the rim 2a;
activating the actuator mans 7 positioned on the machine and connected to a fastening element 6 connected to the shaft 3, for moving the fastening element 6 longitudinally along the shaft 3 and intercepting the locking device 5 for locking the rim 2a against the contact element 4.

According to the invention, the step of activating of the actuator (means) 7 comprises the steps of:
generating a wireless control signal using an emitter 8, connected to the locking device 5;
receiving the control signal using a wireless signal receiver 9 designed to activate the actuator (means) 7 in response to the wireless control signal.

If the locking device comprises a grip surface 5a which can be gripped by a user and an actuator triggering element 8a connected to the emitter 8 for controlling the generation of the wireless control signal, the step of generating a wireless control signal comprises a step of:
actuating the emitter 8 using the actuator triggering element 8a, activated by hand by the user gripping the locking device 5.

If the locking device 5 comprises a protective element 10, movable between an activated configuration, wherein it prevents a user from interacting with the actuator triggering element 8a, and a deactivated configuration, wherein it allows a user to interact with the manual actuator triggering element 8a, the method for locking the wheel 2 comprising a further step of:
moving the protective element 10 from the activated configuration to the deactivated configuration.

If the locking device 5 is tubular 5, the step of coupling the locking device 5 to the shaft 3 comprises a step of:
inserting the shaft 3 in the locking device 5.

If the machine 1 has the hollow shaft 3, the locking device 5 is of a clamping rod having a first end, which can be coupled to the actuator (means) 7, and a second end, which can be gripped by a user, the step of coupling the locking device 5 to the fastening element 6 comprising a step of:
inserting the locking device 5 in an empty passage defined inside the shaft 3.

In a preferred embodiment, there is also a method for releasing the wheel 2, having a rim 2a and a tyre 2b, from the shaft 3 of a wheel service machine 1. Preferably, the method comprises generating a wireless control signal using the emitter 8, connected to the locking device 5, and receiving the control signal using the receiver 9, designed to activate the actuator (means) 7 and release the wheel 2.

It is observed that the fastening element 6 is movable along the shaft 3, longitudinally, that is, along a longitudinal direction parallel to the longitudinal axis A of the shaft 3; therefore, the fastening element 6 is movable parallel to the longitudinal axis A. It is observed that, in the relative movement along the longitudinal axis A between the coupling element and the shaft 3, the coupling element is movable and the shaft is stationary (in fact, the movement of the shaft 3 is a rotation around axis A).

What is claimed is:
1. A vehicle wheel service machine, for performing operations on a wheel having a rim and a tyre, comprising:
a shaft rotating about a longitudinal axis, designed to rotatably support the wheel;
a contact element, connected to the shaft for rotating integrally with it and designed to make contact with the rim supported by the shaft;
a locking device, which can be removably coupled to the shaft and is designed to slide relative to the shaft along the longitudinal axis between an active position, close to the contact element, for locking the rim interposed between the contact element and the locking device, and a position away from the contact element, of non-interference with the rim;
a fastening element movably connected to the shaft for moving along the shaft, parallel to the longitudinal axis, for coupling with the locking device and dragging it in movement;
an actuator positioned on the machine and connected to the fastening element, wherein the locking device comprises an emitter designed to generate a wireless control signal, and wherein the machine comprises a wireless signal receiver designed to actuate the actuator in response to the wireless control signal.

2. The machine according to claim 1, wherein the locking device comprises a grip surface to be gripped by a user, and a triggering element connected to the emitter for controlling the generation of the wireless control signal and designed for being actuated by a hand of the user gripping the locking device.

3. The machine according to claim 2, wherein the locking device comprises a protective element movable between an activated configuration, wherein it prevents an interaction of the hand of the user gripping the locking device with the actuator element, and a deactivated configuration, wherein it allows an interaction of the hand of the user gripping the locking device with the actuator element.

4. The machine according to claim 1, wherein the wireless control signal is a mechanical wave or an electromagnetic wave.

5. The machine according to claim 1, comprising a tube for inflating the tyre, where the tube is connected to a compressed air generator through a solenoid valve, and/or a lifting device for lifting the wheel above the ground, wherein the emitter is designed to generate at least one further wireless control signal, and wherein the receiver is designed to actuate the solenoid valve and/or the lifting device in response to the further wireless control signal.

6. The machine according to claim 1, wherein the locking device is tubular and forms a through hole, to allow it to be passed through by the shaft.

7. The machine according to claim 1, wherein the shaft is hollow and wherein the locking device is a clamping rod having a first end and a second end, wherein the first end is designed to be inserted in the hollow shaft to connect to the actuator, and the second end can be gripped by a user.

8. The machine according to claim 7, wherein the emitter is an optical emitter designed for emitting an optical signal, directed along the longitudinal axis, in an empty passage defined inside the shaft.

9. A machine according to claim 1, wherein said emitter is an acoustic emitter, configured to generate a sound wave defining said wireless control signal.

10. A machine according to claim 1, wherein said emitter is an electromagnetic emitter, configured to generate an electromagnetic wave defining said wireless control signal.

11. A wheel balancer, for performing operations on a wheel having a rim and a tyre, comprising:
  a shaft rotating about a longitudinal axis, designed to rotatably support the wheel;
  a contact element, connected to the shaft for rotating integrally with it and designed to make contact with the rim supported by the shaft;
  a locking device, which can be removably coupled to the shaft to slide along the longitudinal axis of the shaft between an active position, close to the contact element, for locking the rim interposed between the contact element and the locking device, and a position away from the contact element, of non-interference with the rim;
  a fastening element movably connected to the shaft for moving along the shaft, for coupling with the locking device and dragging it in movement;
  an actuator positioned on the machine and connected to the fastening element, wherein the locking device comprises an emitter configured to generate a wireless control signal, and wherein the machine comprises a wireless signal receiver designed to drive the actuator in response to the wireless control signal.

12. The wheel balancer according to claim 11, wherein the wireless control signal is a mechanical wave, or an electromagnetic wave, or an optical signal.

13. The wheel balancer according to claim 11, wherein the locking device comprises a grip surface to be gripped by a user, and a triggering element connected to the emitter for controlling the generation of the wireless control signal and designed for being actuated by a hand of the user gripping the locking device.

14. A locking device for locking a wheel, equipped with a rim and a tyre, on a rotary shaft of a wheel service machine, wherein the machine has: a contact element, which is integral with the shaft to make contact with the rim;
  a fastening element movably connected to the shaft for coupling with the locking device and pulling it in movement;
  an actuator positioned on the machine and connected to the fastening element, wherein the locking device is without an actuator, is elongate in a longitudinal direction and comprises: a contact surface, positioned transversally to the longitudinal direction and designed to make contact with the rim interposed between the contact element and the locking device and fix the rim to the shaft;
  a coupling and guide surface, cylindrical in shape, designed for coupling with the shaft;
  a fastening structure, designed for coupling with the fastening element and allowing a pulling of the locking device along the shaft, an emitter designed to generate a wireless control signal, which can be received by a wireless signal receiver on the machine to actuate the actuator.

15. The device according to claim 14, comprising a grip surface to be gripped by a user, and an actuator element connected to the emitter for controlling the generation of the wireless control signal and designed for being actuated by a hand of the user gripping the locking device.

16. A method for locking a wheel, having a rim and a tyre, on a shaft of a machine for servicing the wheel, wherein the shaft rotates about a relative longitudinal axis, comprising the following steps:
  coupling the rim to the shaft;
  coupling to the shaft a locking device, in such a way that the rim is interposed between the locking device and a contact element which is integral with the shaft and designed to make contact with the rim;
  activating an actuator means positioned on the machine and connected to a fastening element connected to the shaft, for moving the fastening element longitudinally along the shaft and intercepting the locking device for locking the rim against the contact element, wherein the step of activating the actuator comprises the steps of: generating a wireless control signal using an emitter, connected to the locking device; and
  receiving the wireless control signal using a wireless signal receiver designed to activate the actuator in response to the wireless control signal.

17. The method according to claim 16, wherein the locking device comprises a grip surface to be gripped by a user, and an actuator element connected to the emitter for controlling the generation of the wireless control signal and wherein the step of generating a wireless control signal comprises the step of: actuating the emitter using the actuator element, activated by a hand of the user gripping the locking device.

18. The method according to claim 16, wherein the locking device comprises a protective element, movable between an activated configuration, wherein it prevents a user from interacting with the actuator element, and a deactivated configuration, wherein it allows a user to interact with the actuator element, comprising a further step of:

moving the protective element from the activated configuration to the deactivated configuration.

19. The method according to claim 16, wherein the locking device is tubular, and wherein the step of coupling the locking device to the shaft comprises a step for coupling the device to the shaft for inserting the shaft in the locking device.

20. The method according to claim 16, wherein the machine has the hollow shaft and wherein the locking device is a clamping rod having a first end, which can be coupled to the actuator, and a second end, to be gripped by a user and comprising the actuator element, and wherein the step of coupling the locking device to the shaft comprises a step of: inserting the locking device in an empty passage defined inside the shaft.

* * * * *